May 25, 1926.
B. P. JOYCE
PACKING
Filed Sept. 13, 1922
1,585,864
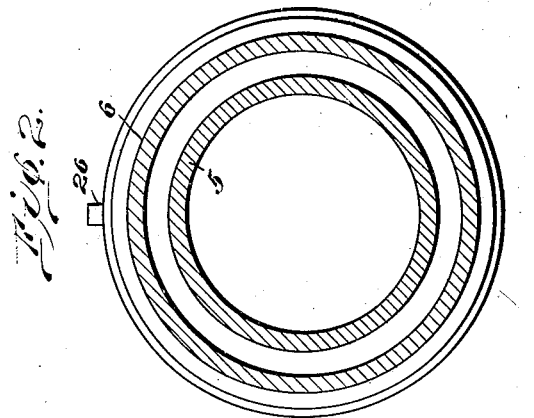
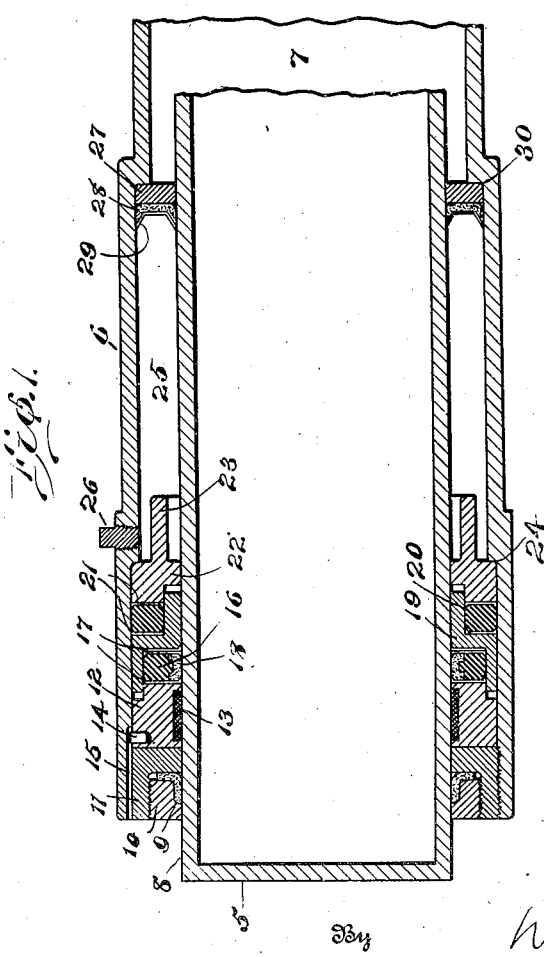
Inventor
B. P. Joyce
By W. N. Roach
Attorney

Patented May 25, 1926.

1,585,864

UNITED STATES PATENT OFFICE.

BRYAN P. JOYCE, OF DAVENPORT, IOWA, ASSIGNOR TO THOMAS A. CONLON, OF SILVER SPRING, MARYLAND.

PACKING.

Application filed September 13, 1922. Serial No. 587,986.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon.

The subject of this invention is a packing intended for use about a movable plunger or rod for the purpose of sealing air or other fluid under pressure.

The main object of the invention is the provision of a packing so arranged that the fluid pressure causes the packing to bear upon the plunger or rod with a greater pressure than that of the fluid, thereby preventing leakage and so obviating the use of packing springs; also lessening the packing friction by making the pressure entirely dependent upon the fluid pressure, rather than upon the packing spring pressure plus the fluid pressure.

With these and other objects in view which will appear as the description proceeds, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a longitudinal section of a fragment of a casing and plunger with packing therein constructed in accordance with my invention;

Fig. 2 is a cross section of the same.

Referring to the drawing by numerals of reference:

A hollow plunger 5 is mounted for reciprocation in the casing 6 and is urged forwardly by the fluid under pressure in the chamber 7. The outer surface 8 of the plunger is preferably highly polished and is kept clean by a suitable annular wiper 9, conveniently formed of leather, which is secured by means of a nut 10 in the head 11 of the casing, which head is secured within the casing by screw threads.

For the purpose of centering the plunger 5 within the casing 6, a ring 12 is positioned within the casing and rests against the inner face of the head 11, such ring being provided with an annular groove formed in its inner face in which is seated a ring 13, preferably of anti-friction metal, which ring engages the surface of the plunger. The ring 12 is secured against rotation with respect to the casing 6 preferably by means of a pin 14 carried by the ring and projecting into a longitudinal groove formed in the casing, as shown most clearly in Fig. 1.

A resilient packing ring encircles the plunger and rests against the centering ring 12, such ring preferably consisting of a rubber ring 16 held between the metallic rings 17 and faced with a leather ring 18 which bears against the surface of the plunger. The resilient ring is held against the plunger and the centering ring 12 by means of a ring 19, substantially Z-shaped in cross section which ring serves to retain a resilient ring 20, preferably formed of rubber and held between the thin metal rings 21, against the inner surface of the casing 6. The resilient ring 20 is confined between the Z-shaped ring 19 and a ring 22 which is provided with an annular extension 23, for a purpose soon to be described, and this ring rests against an annular shoulder 24 formed on the inner surface of the casing 6.

Between the casing 6 and the plunger 5 is provided a lubricant chamber 25 which may be filled through a port in the casing 6 which is normally closed by means of the screw plug 26. A ring 27, to which are secured or against which may seat a leather ring 28 and a thin metal ring 29, seats against a shoulder 30 formed on the interior of the casing 6 and forms one wall of the lubricant chamber 25. The extension 23 serves to prevent rings 27, 28 and 29 from being forced to a position to close the port through which lubricant is forced into the chamber 25.

As will be readily understood, when fluid under pressure is supplied to the chamber 7 this pressure will be communicated to the ring 27 and through the lubricant in the chamber 25 to the ring 22, from which it will be conveyed to the resilient packing rings 20 and 16 so that the ring 20 will seal the stationary joint, and the ring 16 under compression presses against the leather ring 18 and seals the moving joint as its contact pressure is boosted owing to the fact that the air pressure over the entire annulus between the plunger 5 and the casing 6 is exerted upon the smaller annular area of the packing ring.

I claim:

1. The combination with a casing formed with spaced apart annular shoulders therein, a plunger reciprocable within the casing and a lubricant chamber between said plunger and casing, of a head for the casing encircling the plunger, a wiper encircling the plunger and secured to the head, a centering ring within the casing and resting against the head, said ring formed with an annular groove in its inner surface, a ring of anti-friction material seated in the groove and contacting the plunger, means for locking the centering ring against turning with respect to the casing, a resilient packing ring resting against the centering ring and engaging the plunger, a Z-shaped ring engaging the resilient packing ring to force the same against the centering ring and the plunger, a second resilient ring engaging the Z-shaped ring contacting the inner surface of the casing, a ring seated against a shoulder of the casing and engaging the second resilient ring, said ring formed with an annular extension and a packing ring spaced from the annular extension and seated against the other annular shoulder of the casing.

2. The combination with a casing and a plunger reciprocable within the casing, of a head for the casing encircling the plunger, a wiper encircling the plunger and secured to the head, a centering ring within the casing and resting against the head, said ring formed with an annular groove in its inner surface, a ring of anti-friction material seated in the groove and contacting the plunger, means for holding the centering ring against turning with respect to the casing, a resilient packing ring resting against the centering ring and engaging the plunger, a Z-shaped ring engaging the resilient packing ring to force the same against the centering ring and the plunger, a second resilient ring engaging the Z-shaped ring and contacting the interior surface of the casing and a ring engaging the second resilient ring and movable to force the same against the Z-shaped ring and the casing.

3. The combination with a casing and a plunger reciprocable within the casing, of a head for the casing and encircling the plunger, a wiper carried by the head and contacting the plunger, a centering ring within the casing resting against the head and encircling the plunger, a resilient packing ring engaging the plunger, a second resilient packing ring engaging the casing and fluid pressure actuated means engaging the resilient rings the surface area of said means in contact with the fluid being greater than the surface area in contact with the rings, whereby a greater pressure per unit area is exerted upon the rings than the fluid pressure per unit area upon the means.

BRYAN P. JOYCE.